(12) United States Patent
Houser et al.

(10) Patent No.: US 8,482,145 B2
(45) Date of Patent: *Jul. 9, 2013

(54) OCEAN ENERGY SYSTEM AND METHOD

(75) Inventors: Michael Houser, Jacksonville, OR (US); Cameron Price, Dubai (UA)

(73) Assignee: Ocean Energy Management Limited, Tortola (VG)

( * ) Notice: Subject to any disclaimer, the term of this patent is extended or adjusted under 35 U.S.C. 154(b) by 502 days.

This patent is subject to a terminal disclaimer.

(21) Appl. No.: 12/846,189

(22) Filed: Jul. 29, 2010

(65) Prior Publication Data

US 2011/0049897 A1    Mar. 3, 2011

Related U.S. Application Data

(63) Continuation-in-part of application No. 11/942,600, filed on Nov. 19, 2007, now Pat. No. 7,786,609.

(51) Int. Cl.
*F03B 13/10* (2006.01)
(52) U.S. Cl.
USPC .............................................. 290/53; 290/42
(58) Field of Classification Search
USPC ............................... 290/42, 43, 44, 53, 54, 55
See application file for complete search history.

(56) References Cited

U.S. PATENT DOCUMENTS

| | | | |
|---|---|---|---|
| 3,664,125 | A | 5/1972 | Strange |
| 3,668,412 | A | 6/1972 | Vrana et al. |
| 3,777,494 | A | 12/1973 | Soderlund |
| 3,898,471 | A | 8/1975 | Schera, Jr. |
| 3,930,168 | A | 12/1975 | Tornabene |
| 3,959,663 | A | 5/1976 | Rusby |
| 4,206,601 | A | 6/1980 | Eberle |
| 4,249,085 | A | 2/1981 | Kertzman |
| 4,434,375 | A | 2/1984 | Taylor |
| 4,577,581 | A | 3/1986 | Puech |
| 4,672,222 | A | 6/1987 | Ames |

(Continued)

FOREIGN PATENT DOCUMENTS

| | | |
|---|---|---|
| WO | WO 2009/078735 | 6/2009 |
| WO | WO 2009/142504 | 11/2009 |

OTHER PUBLICATIONS

PCT/US2011/044759, International Search Report dated Dec. 22, 2011.

(Continued)

*Primary Examiner* — Nicholas Ponomarenko
(74) *Attorney, Agent, or Firm* — DLA Piper LLP (US)

(57) ABSTRACT

A wave energy system and method are provided that have a main body that floats on the surface of the ocean and generates energy due to the motion of the crests and troughs of the ocean.

22 Claims, 14 Drawing Sheets

U.S. PATENT DOCUMENTS

| | | | |
|---|---|---|---|
| 4,872,309 A | 10/1989 | Jaenichen, Sr. | |
| 5,167,786 A | 12/1992 | Eberle | |
| 5,411,377 A | 5/1995 | Houser et al. | |
| 5,894,808 A | 4/1999 | Miyoshi | |
| 5,929,531 A | 7/1999 | Lagno | |
| 5,986,349 A | 11/1999 | Eberle | |
| 6,388,342 B1 | 5/2002 | Vetterick et al. | |
| 6,956,299 B2 | 10/2005 | Serrano Molina et al. | |
| 7,245,041 B1 | 7/2007 | Olson | |
| 7,687,931 B2 | 3/2010 | Gasendo | |
| 7,786,609 B2 * | 8/2010 | Houser et al. | 290/53 |
| 2009/0127858 A1 * | 5/2009 | Houser et al. | 290/53 |

OTHER PUBLICATIONS

PCT/US2011/044759, Written Opinion dated Dec. 22, 2011.

Verdant Power; Next Generation/Unconventional Hydropower, Wave & Tidal Energy Devices . . . and More!, Renewable Energy Modeling Workshop on Hydroelectric Power, May 10, 2005 (23 Das.).

PCT/US2008/083277 International Search Report, dated Mar. 30, 2009.

PCT/US2008/083277 Written Opinion dated Mar. 30, 2009.

* cited by examiner

OCEAN ENERGY SYSTEM AND METHOD

PRIORITY CLAIMS/RELATED APPLICATIONS

This application claims priority under 35 USC 120 and is a continuation-in-part of U.S. patent application Ser. No. 11/942,600 filed on Nov. 19, 2007 and entitled "Ocean Energy System and Method", the entirety of which is incorporated herein by reference.

FIELD

The system and method relate generally to energy generation and in particular to a system and method for generating energy from wave motion.

BACKGROUND

Recently, systems that allow the generation of energy from the ocean and its motion are getting more attention because the ocean can be used to generate energy without any environmental issues, without reducing any natural resource and in a completely clean manner. To date, the systems that have been developed to generate energy from the ocean and wave motion include tapered channel systems that operate by funneling incoming waves into shoreline reservoirs that raise the water level above sea level so that the water can then run down through a turbine and generate energy. An example of a tapered channel system is OceanNor's Tap Chan device. Another wave energy system is a float system that consists of buoys sitting on the surface of the ocean and, as the wave rises and falls, the relative motion between the float and the ocean floor drives hydraulic pumps or pistons which is then used to drive a turbine. An example of a float system is the Sea Power and Associates Wave Rider system. Another wave energy system is an oscillating water column systems that are fixed generating devices in which waves enter the column and force air past a turbine and then, as the wave retreats, the air pressure drops that causes the turbine to turn and generate energy. Examples of the oscillating water column system are the WaveGen Limpet system and the Energetech's Dessiss-Auld turbine. Another wave energy system is an underwater turbine system that captures the movement of the ocean's currents and uses this energy to drive slow-moving blades that is turn power a generator. An example of the underwater turbine system is Blue Energy's Davis Hydro Turbine.

None of the conventional system has proven to be practical is long term use due to the complexity of the construction, the likelihood of failure and costs and thus it is desirable to provide a wave energy system and method that overcomes the limitations of these systems and it is to this end that the present invention is directed.

DETAILED DESCRIPTION OF ONE OR MORE EMBODIMENTS

The device and method is particularly applicable to a wave energy device and system that uses electric generators and it is in this context that the device and method will be described. It will be appreciated, however, that the device and method has greater utility since it can be used with other energy generators, other implementations and other materials that those illustrated and described below and the device and method are not limited to the particular embodiments and implementations described herein.

Figure 1:
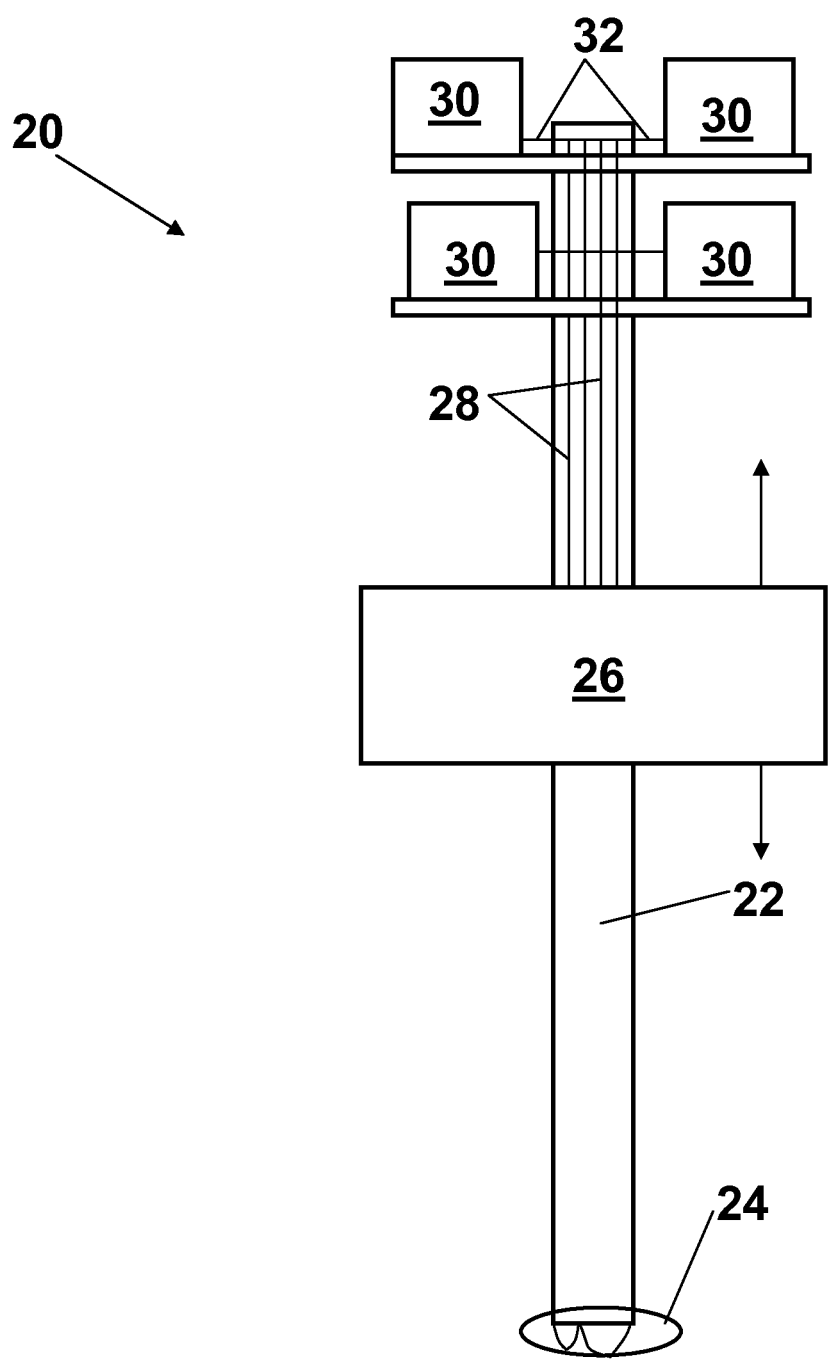
FIG. 1 illustrates an embodiment of a wave energy device.

FIG. 1 illustrates an embodiment of a wave energy device 20 that includes a piling 22 (a mono pile) that has a sharpened bottom portion 24 so that the piling 22 can be pile driven into the floor of a body of water with wave activity, such as an ocean or other salt or brackish water body or a fresh water body of water. In one embodiment, the piling may have a circular cross section but the wave energy device may use a piling having various cross-sections and the wave energy device is not limited to any particular shape or cross-section of the piling. The piling may be hollow (a pipe) or it may be solid or filling in with a material. In one embodiment, the bottom portion of the piling may also have an interface 24, such as a set of teeth or added flutes, so that the piling can be rotated which causes either the added flutes or the teeth to dig into the floor of the body of water and thus screw the piling into the floor of the body to water (and set the piling) to provide a stable structure for the rest of the wave energy device. The set of teeth 24 allow the piling to be quickly and securely deployed without the stress of "pounding" the piling into place as with conventional technology. For example, the set of teeth may be a set of saw teeth. The piling 22 of the wave energy device 20 may have several configurations depending on various geological conditions into which the pilings will be set. One type of piling may be used to cut or break stone while another configuration may be used for sand or mud will screw itself into the soil. In one implementation of the piling, the piling is a tube in which the leading edge 24 is fitted with cutters much like a "hole saw" and the trailing edge is fitted with a locking mechanism that attaches to a large power driven ratcheting tool. The cutting edge of the piling's teeth are off set to add clearance to the sidewalls so the soil does not create excessive friction on the piling as it is rotated into place. In an exemplary implementation, the piling 22 may be approximately 6' in diameter with a wall thickness of approximately 2" of steel, but these dimensions could change depending on the structural and/or environmental loads the component is engineered to accommodate. The length of the piling 22 will depend on the depth of the water of the body of water, the depth of secured mounting in the geology, the height of maximum tide for the particular body of water, and/or the height of the decks 50. For example, in 60 feet of water, the piling 22 may be approximate 200 feet in length. The piling 22 may be made of an alloy that should be able to withstand the marine environment and resist electrolytic deterioration. In addition, the buoyancy of the piling 22 may need to be canceled and the structural integrity strengthened perhaps by back filling the piling with concrete &/or rebar to water level. In another embodiment, the piling 22 may be set by hydraulic (or pneumatic) pressure/jets on the cutting edge, to cut clearance into the strata. It may also be possible to use the piling 22 as a water (or pneumatic) jet to accomplish deployment also has merit.

The wave energy device 20 may further comprise a float structure 26, mounted around the piling so that the float structure can move up and down the piling as wave crests and troughs pass the wave energy device. As the float structure moves up and down the piling, one or more drive structures 28, such as a drive shaft in one embodiment that moves up and down as the flow moves up and down, transfer the movement of the float to one or more energy generators 30 (via one or more coupling mechanisms 32) that convert the motion of the float into a form of energy, such as electrical energy is one embodiment. The float may be made on a structural frame capable of supporting itself and lifting a mass and assembly, but it may also have to be light enough to minimize the negative effects its weight will have on the lifting action. The float may have a plurality of different shapes. In one implementation, the float structure 26 may be a torus shaped float being made of molded fiberglass with structural bulkheads installed (like a ships hull) that all support the framework attaching to a yoke assembly. The float 26 may also have some mechanism to sink or detach the float 26 in the event of dangerous water body conditions (such as a tsunami). For example, flood hatches and/or explosive bolt mechanisms can allow the water in so that the float sinks to the bottom for safe redeployment later. In one implementation, the float 26 may be approximately 60' in diameter (an estimated largest size that will allow full travel within wave action) with a hole in the middle of perhaps 20' or so (engineered for clearance) and a height of perhaps 20'. However, the wave energy device is not limited to any particular size and shape and the size and shape may be adjusted to lift the mass and articulate it within the wave action with the most vertical travel possible and to survive in the water body environment.

The wave energy device may then have an energy storage device (not shown) to store the generated energy for some period of time or may have a mechanism (not shown) for transferring the generated energy to another location. The energy generators 30 may generate electrical energy, kinetic energy, rotational energy or any other type of energy and may be a device that converts the energy from the float into a storable or transferable energy form. The wave energy device may also include a windmill located at the top of the piling to generate additional energy, a known tidal wave generator at the bottom of the piling to generate additional energy or a field and magnetic coil at the center of the piling that may generate energy as the float structure moves up and down the piling during the wave movements.

Figure 2:
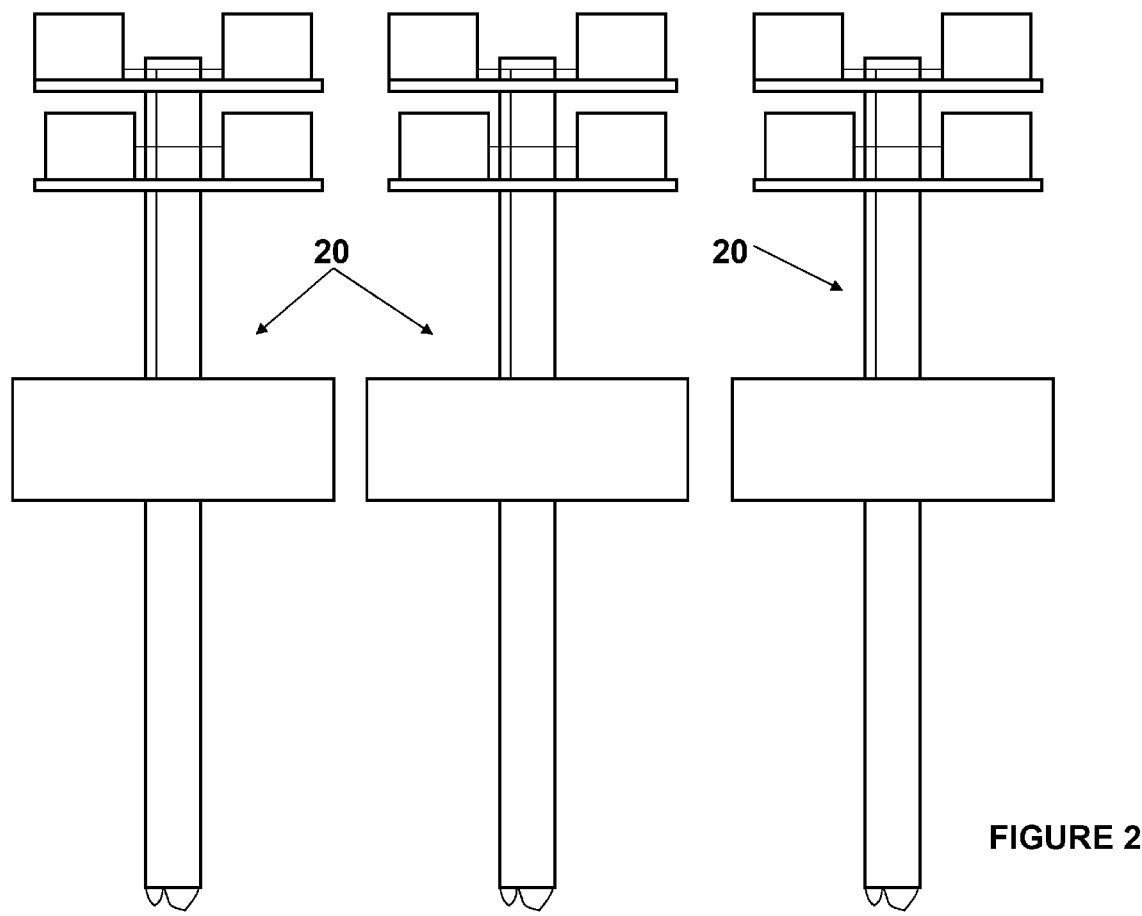
FIG. 2 illustrates a wave energy system having one or more of the wave energy devices shown in FIG. 1.

FIG. 2 illustrates a wave energy system having one or more of the wave energy devices 20 shown in FIG. 1. The wave energy system may be an energy generation system that combines one or more of the wave energy devices 20 together that together generate an amount of energy similar to a power plant or a wind farm with a plurality of windmills. The wave energy system may be a plurality of wave energy devices located within a particular geographic area/region or can be the plurality of wave energy devices at different geographic areas that are linked together.

Figure 3:
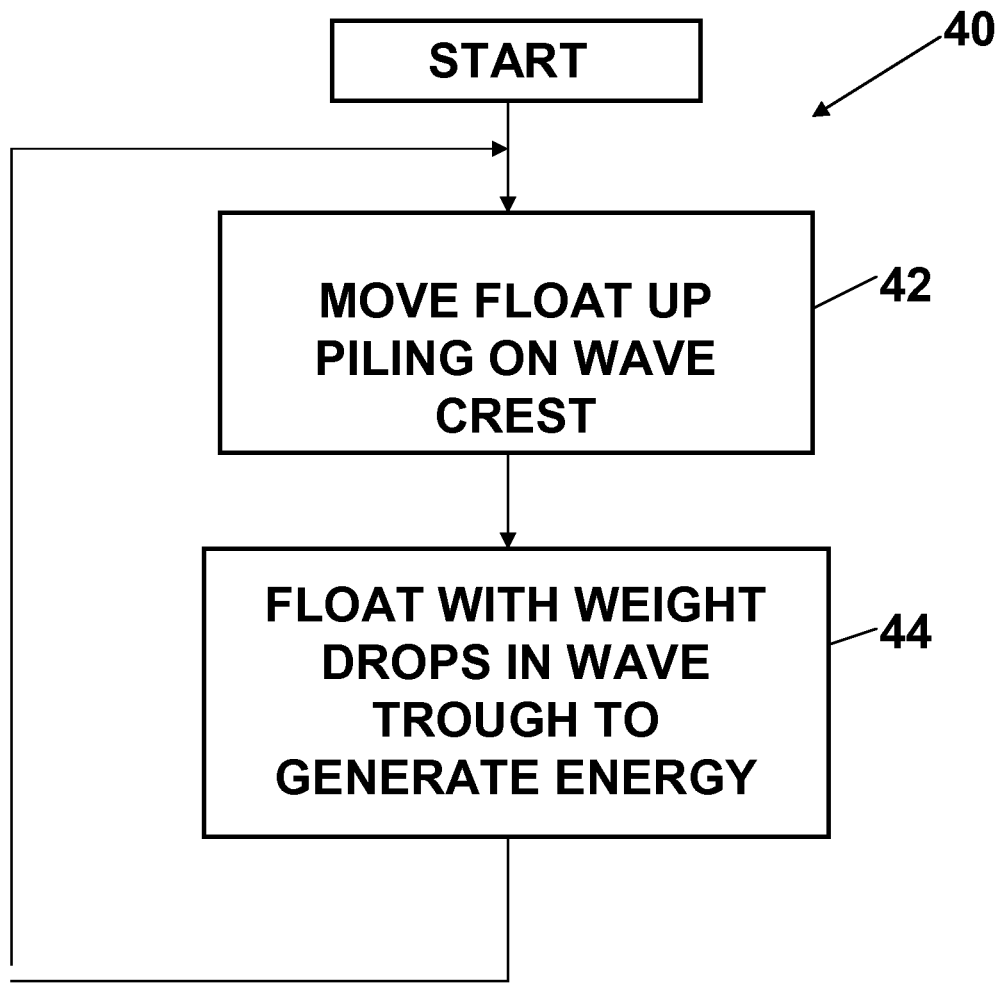
FIG. 3 illustrates a method for generating energy from wave motion using the wave energy device.

FIG. 3 illustrates a method 40 for generating energy from wave motion using the wave energy device. To generate energy, the wave energy device float moves up the piling as a wave crest passes by the piling (42) to generate potential energy and then drops down the piling during the wave trough (44) to generate kinetic energy that is then translated into electrical energy or some other form for energy. The process shown in FIG. 3 repeats itself for each wave crest and wave trough that passes the piling and amount of generated energy depends on the difference in height between the wave crest and the wave trough. The total energy generated by a wave energy system that has a plurality of wave energy devices is thus the energy generated by each wave energy device combined together. Now, the wave energy device is described in more detail.

Figure 4:
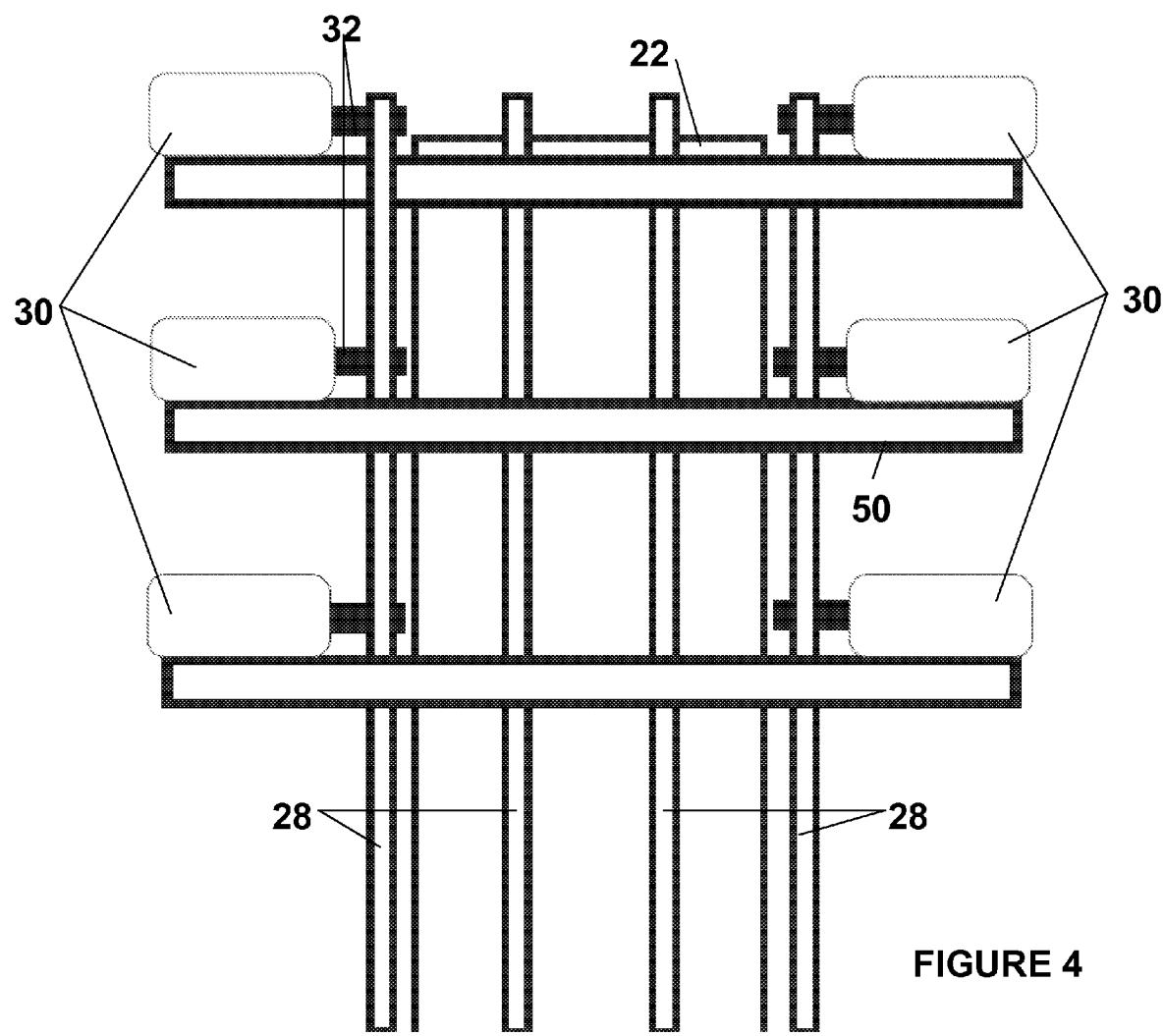
FIG. 4 illustrates an upper portion of the embodiment of the wave energy device shown in FIG. 1.

FIG. 4 illustrates an upper portion of the wave energy device 20 shown in FIG. 1 wherein a closer view of the drive structures 28, generators 30 and coupling mechanism 32 are shown. The generators 30 may be one or more platforms 50 that are secured to the top of the piling. The wave energy device is not limited to any particular number of platforms and/or number of generators. In one embodiment, the platforms are circular and encircle a circular piling so that there may four or six or more generators 30 on each platform wherein each generator is coupled to the drive structures 28. As shown in the embodiment shown in FIG. 4, each drive structure 28 may be coupled to a generator 30 on each platform 50 to generate a maximum amount of energy from each drive structure. However, the wave energy device may also have each drive structure 28 coupled to a single generator 30.

Figure 5:
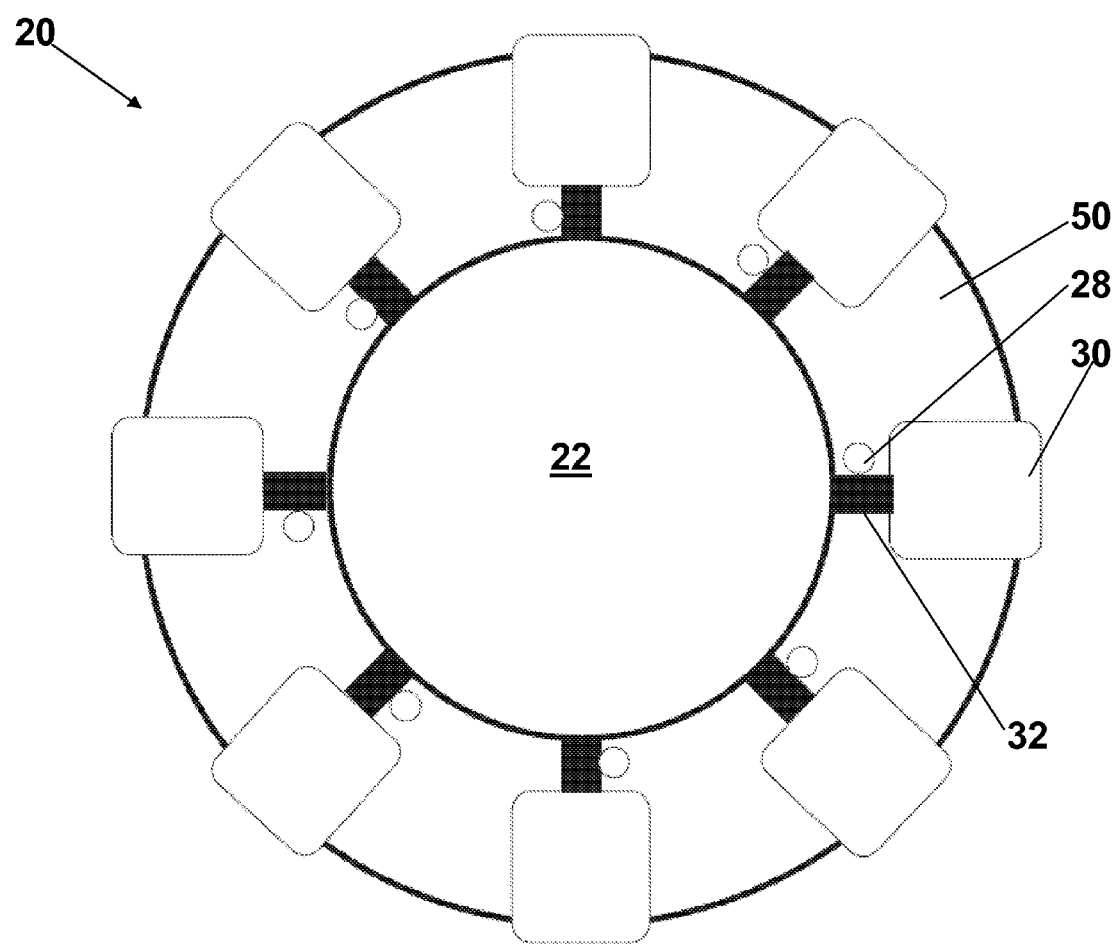
FIG. 5 illustrates a top view of the embodiment of the wave energy device shown in FIG. 1.

FIG. 5 illustrates a top view of the wave energy device 20 shown in FIG. 1 wherein the piling 22 has a circular cross-section, the platform 50 surrounds the piling 22 so that each of the one or more platforms has 8 generators 30 and there are eight drive structures 28 that are coupled to each generator 30 as shown.

Figure 6:
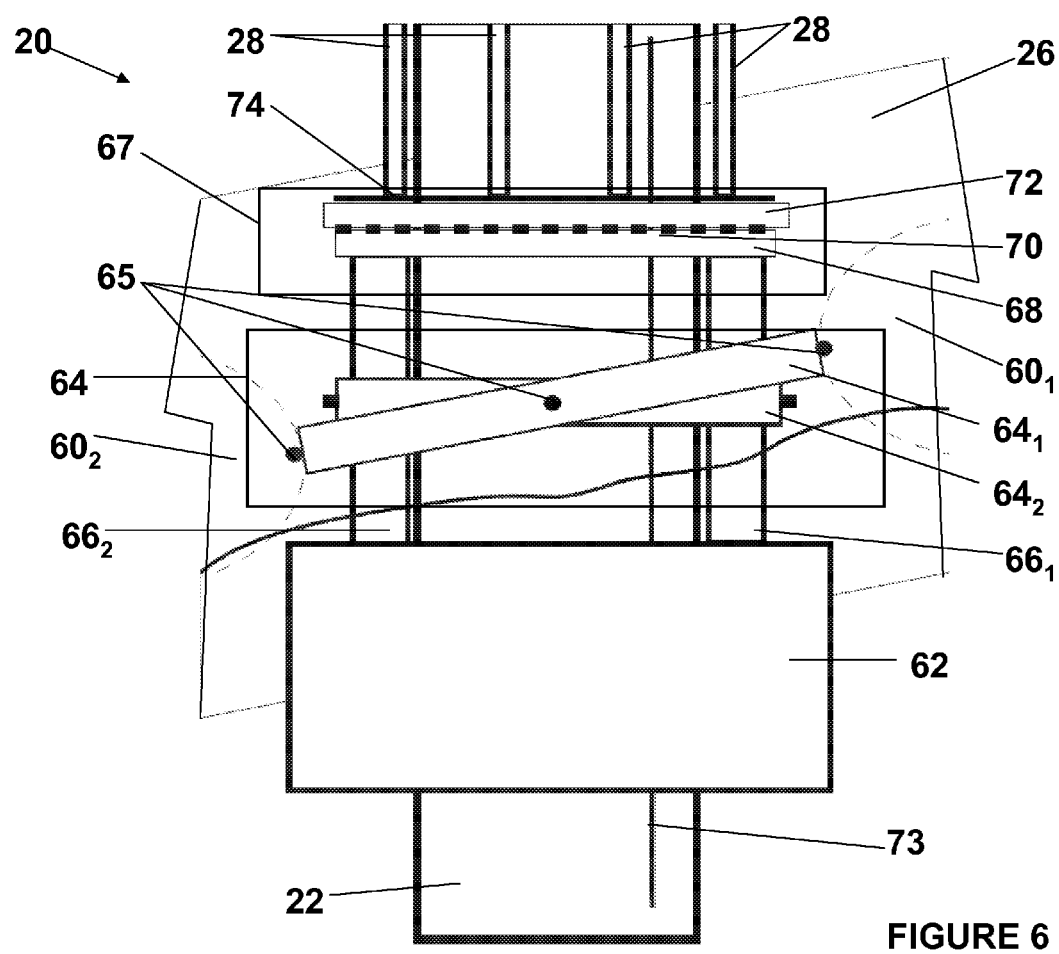
FIG. 6 illustrates more details of the float portion of the embodiment of the wave energy device shown in FIG. 1.

FIG. 6 illustrates more details of the float portion 26 of the wave energy device 20 shown in FIG. 1. The float may have one or more buoyant portions 60, such as first buoyant portion 60$_1$ and a second buoyant portion 60$_2$ located on opposite sides of the piling 22 as shown, that have sufficient buoyancy to cause the float 26 of the wave energy device 20 to float up the piling during a wave crest. Each buoyant portion may be made of a composite material that is light, but strong (such as fiberglass, carbon fiber, etc.) In one implementation, the float portion 26 may be 60 feet in diameter with a 20 foot hole in the center and may be approximately 30-40 feet tall. The one or more buoyant portions 60 will have an amount of buoyancy that allows the wave energy device 20 to operate in its intended manner.

The float 26 may further include a mass 62 that, when a wave trough occurs, causes the float to drop down the piling and generate a linear movement of the drive structures 28. The mass 62 may be at least 50,000 lbs, but may also be one or more tons and the weight is based in part of the buoyancy of the of the float portion 26. The total weight of the mass 62 directly affects the energy output of the device since the largest weight of the mass 62 that travel over the greatest distance results in the most power output of the wave energy device. The mass 62 is a weight that rides smoothly up and down the piling 22. The float 26 attached to the mass component 62 lifts up the weight when a wave passes by the wave energy device 20 providing the upward motion. The force of the mass dropping (when the wave travels past the device) by its own weight and with gravity acting on it is the power element of the device. The shape of the mass if mounted in the water should be hydrodynamic. The mass may be fabricated of a casing that has been filled with scrap metal encapsulated to secure the scrap metal its structural mounting points. The mass 62 may include roller bearings that provide clearance for the mass to travel up and down the piling 22. The mounting point of the mass 62 can be attaching the mass to the power collar 66 or the mass 62, in another configuration, can be attached to an articulating yoke 64.

Figure 7:
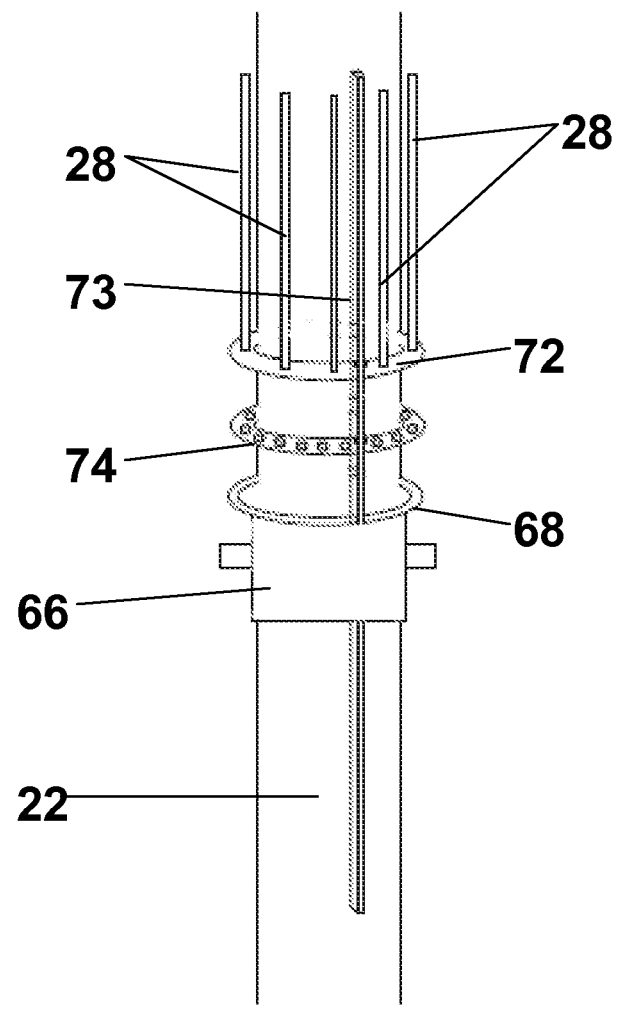
FIG. 7 illustrates more details of the power collar and keyrace of the embodiment of the wave energy device shown in FIG. 1.
Figure 8:
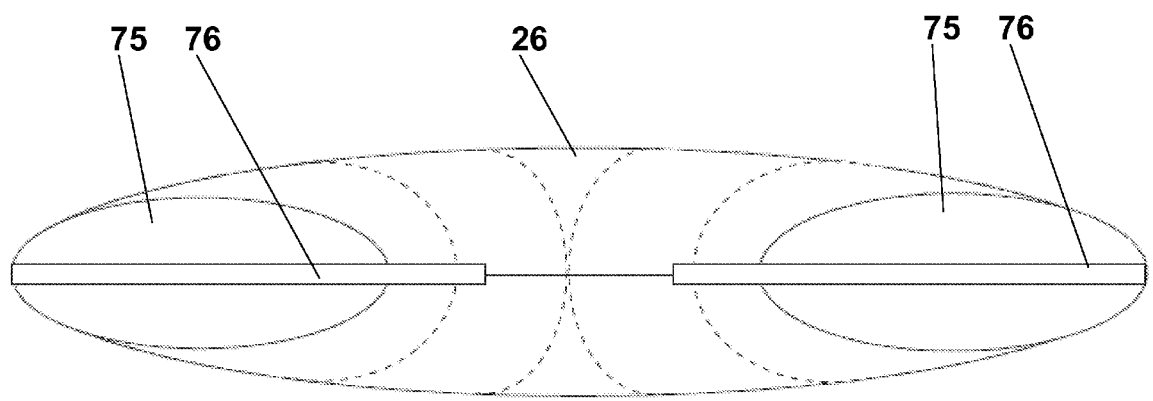
FIG. 8 illustrates more details of the float of the embodiment of the wave energy device shown in FIG. 1.

The float 26 may further include an articulating drive yoke 64 that permit the buoyant portions 60 to move horizontally relative to the piling and the mass. This allow the float 26, when a wave crest is approaching the wave energy device (as shown in FIG. 7), to have the first buoyant portion $60_1$ at a higher vertical position than the second buoyant portion $60_2$ so that the float "follows" the wave shape and then allows the float 26, when the wave trough is approaching the wave energy device (as shown in FIG. 8), to have the first buoyant portion $60_1$ at a lower vertical position than the second buoyant portion $60_2$ so that the float again "follows" the wave shape. In one embodiment, the articulating drive yoke 64 may have a first yoke element $64_1$ connected to the first and second buoyant portions $60_1$, $60_2$ and a second yoke element $64_2$ that is connected the float 26 wherein the first and second yoke elements $64_1$, $64_2$ are connected to each other at setoff points by a swivel joint 65 so that the buoyant portions $60_1$, $60_2$ can move relative to the float 26 and the entire float can move rotationally relative to the piling 22. The yoke elements transfer the lifting action of the float 26 to the collar 67 to lift the mass 62 on the upstroke. In more detail, the yoke elements allow for random lateral sea movements of the float 26 to be cancelled out thus directing all the wave movement up and down but still permitting rotational movement of the articulating yoke. In yet another embodiment, the articulating yoke may also include a mechanism to eliminate rotational movement of the float relative to the piling.

In one embodiment, the first and second yoke portions $64_1$, $64_2$ (and one or more additional yoke portions) may be circular rings that encircle the piling. The smaller diameter ring may be designed to clear the power collar 67 in extreme seas should the float 26 overextend the designed lateral movements of the wave energy device 20. In some embodiment, the wave energy device 20 may have a mechanism that can flood the float 26 (automatic float flooding and/or explosive bolts) and sink the float to prevent damage to the wave energy device. In other embodiments, the articulating yoke may have three or more yoke rings which result in a smoother operation, but results in more structural failure points.

The float 26 may further comprise a power collar with first and second element $66_1$, $66_2$ that connect the mass 62 to the float and further to the drive structures 28 so that the downward movement of the mass causes the drive structures 28 to move vertically downwards which is then converted into energy. In one embodiment, the second yoke ring $64_2$ is attached to the power collar 66 that is a tube. The power collar, in one implementation may be a tube about 7' 4" in diameter with approximately 5" thick sidewalls. The power collar slides up and down on the piling 22 with bearing force (for clearance) applied to the piling. The particular length of the power collar 66 may be determined by the spacing of the yoke 64 and float 26 so if there is a critical contact made by extreme lateral forces (float tips beyond perimeters), the contact will be with the power collar 66 (that has bearings) and not the piling. A keyway in the piling clears the power collar and a lower Drive Plate 68 but engages the upper drive plate 72 to stop the rotational forces of the float from being transferred to the drive structures.

The float may further comprise a rotating drive plate 67 that transfers the vertical movement of the mass to the drive structures 28 and provides an interface to isolate the drive structures 28 from the rotational movement of the float 26. In one embodiment, the rotating drive plate 67 may have a first drive plate structure 68 that is connected to the first and second elements $66_1$, $66_2$ and an interface layer 70 that allows the first drive plate structure 68 to rotate relative to a second drive plate structure 72 while transferring the vertical movement of the mass 62 to the drive structures 28 through a drive plate 74 that sits on top of the second drive plate structure 72.

The interface layer 70 may be a steel such as "Corten Steel" that is somewhat non-corrosive and economical. However, the interface layer 70 may also be stainless steel. If a six foot diameter piling is used, the interface layer 70 may have approximately a 6'6" inside diameter, a 7'6" outside diameter and a 4" thickness for each part. The drive plate 74 is a rotational thrust bearing plate that engages a keyway (shown in more detail in FIG. 7 which is described below) which removes rotational forces on the thrust plate 67 allowing the lower plate 68 (that clears the keyway) to revolve while the upper plate 72 does not rotate so that the forces of the waves are now only vertical and linear. In one embodiment, the drive structures 28 move vertically only and these parts are long enough to compensate for tidal variations. Thus, at low tides, the drive structures 28 drive the generators 30 at the end of their length and, at high tides, the drive structures 28 drive the generators 30 further towards the power collar. Thus, by the length of the drive structure 28, the drive structures 28 automatically adjust out tidal variances at the point of power transfer.

FIG. 7 illustrates more details of the power collar and keyrace of the wave energy device shown in FIG. 1. The piling 22 is surrounded by the power collar 66, the first drive plate structure 68 and the second drive plate structure 72 wherein the second drive plate structure 72 has the drive structures 28 attached to it. The wave energy device, in this embodiment, may also have a keyrace 73 and a bearing 74 that permit the first drive plate structure 68 to rotate while the second drive plate structure 72 does not rotate so that the forces of the waves transmitted into the drive structures 28 are now only vertical and linear. In one embodiment, the first drive plate structure 68 attaches to an outer race of the bearing 74, but can rotate relative to the keyrace 73 so that it can rotate freely with the float 26. The second drive plate structure 72 attaches to an inner race of the bearing 74 but can only move vertically along the keyrace 73 to thereby remove the rotational motion.

FIG. 8 illustrates more details of the float 26 of the wave energy device shown in FIG. 1. The float may include an internal bulkhead 75 at each end of the float (that provides floatation) and a support shaft 76 that couples the internal bulkhead to the yokes $64_1$, $64_2$ of the float. In one embodiment, the internal bulkheads may be made of a plywood/fiberglass laminate and the support shaft may be made of a strong material such as steel or other strong metals and may be for example a steel tube with bearings.

Figure 9:
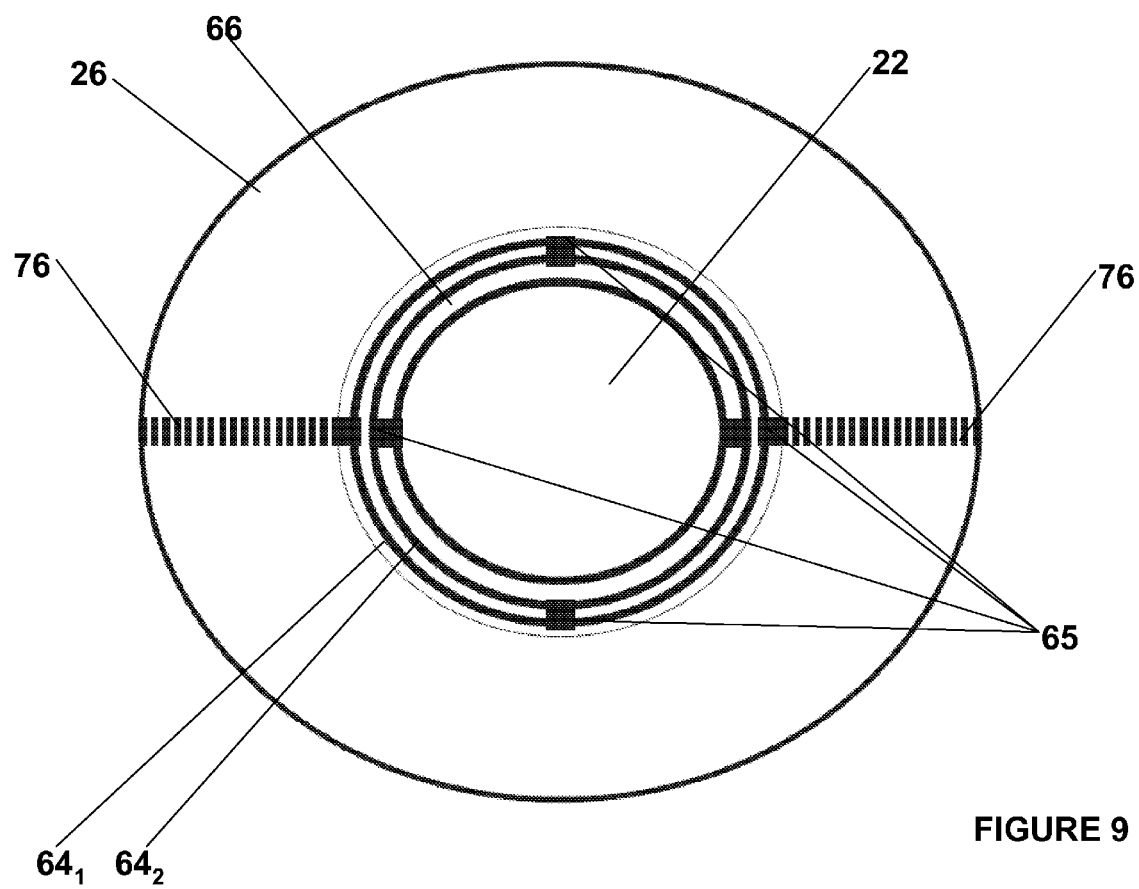
FIG. 9 illustrates a top view of the embodiment of the wave energy device shown in FIG. 1.

FIG. 9 illustrates a top view of the wave energy device shown in FIG. 1. The wave energy device, in this embodiment, is concentric with the piling 22, but may also be non-concentric. The power collar 66 slides up and down the piling 22 and has the yokes $64_1$, $64_2$ attached thereto by the swivel joints 65. The swivel joints 65 also connect the float 26 to the yokes $64_1$, $64_2$ via the support shafts 76 of the float. Now, an example of the upstroke and downstroke of the wave energy device is described in more detail.

Figure 10:
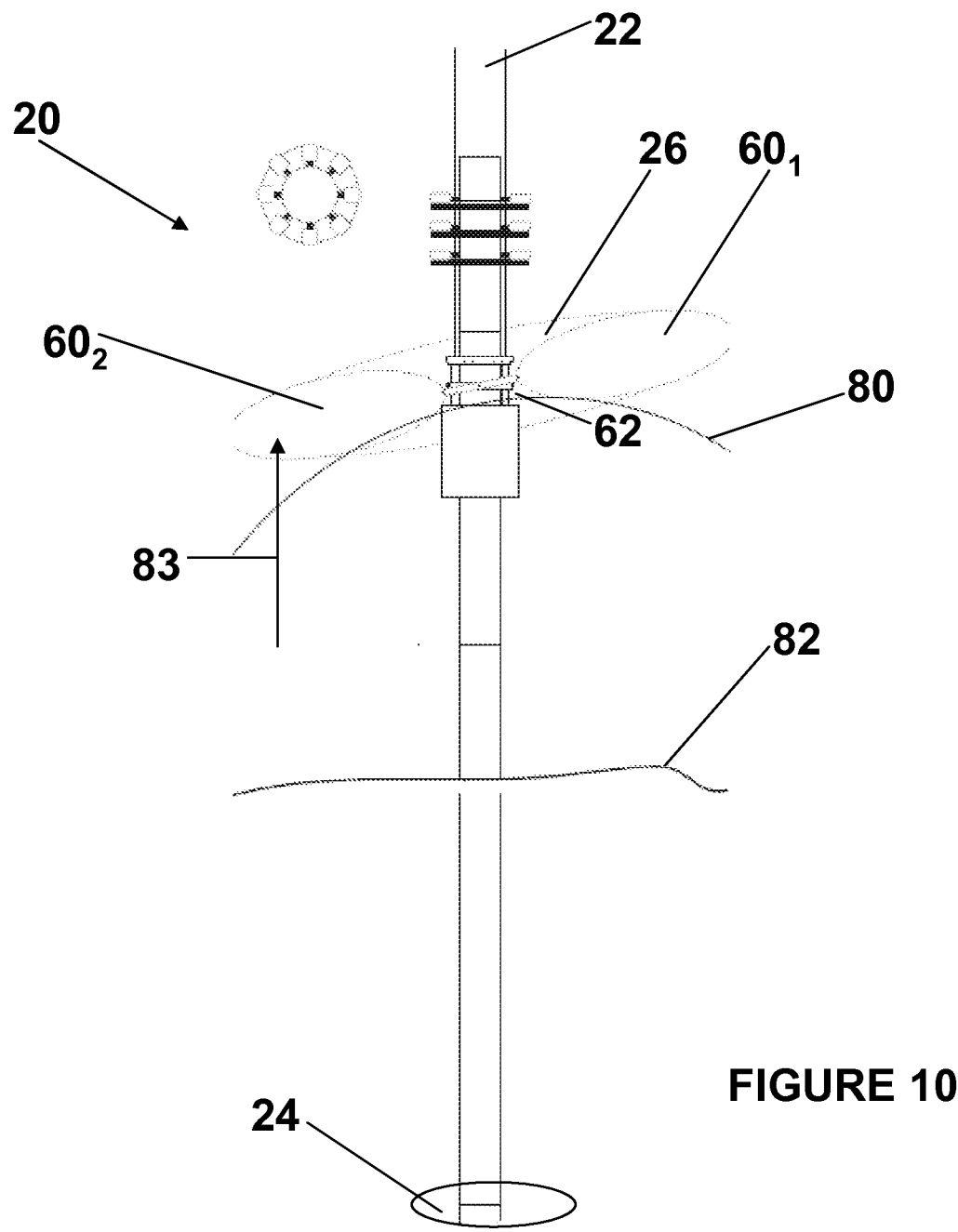
FIG. 10 illustrates the wave energy device during a wave crest corresponding to an upstroke of the wave energy device.

FIG. 10 illustrates the wave energy device 20 during a wave crest 80 relative to a water body floor 82 corresponding to an upstroke of the wave energy device. As shown, when the float 26 of the wave energy device 20 is moving up to the top of the wave crest (83), the first buoyant portion $60_1$ is at a higher vertical position than the second buoyant portion $60_2$ so that the float "follows" the wave shape and there is not any undue stress of the float or the wave energy device due to the shape of the wave. During the upstroke as shown in FIG. 7, since the float 26 is moving upwards on the piling 22 due to the wave crest, the wave energy device is storing potential energy in the wave energy device which is then released during the downstroke.

Figure 11:
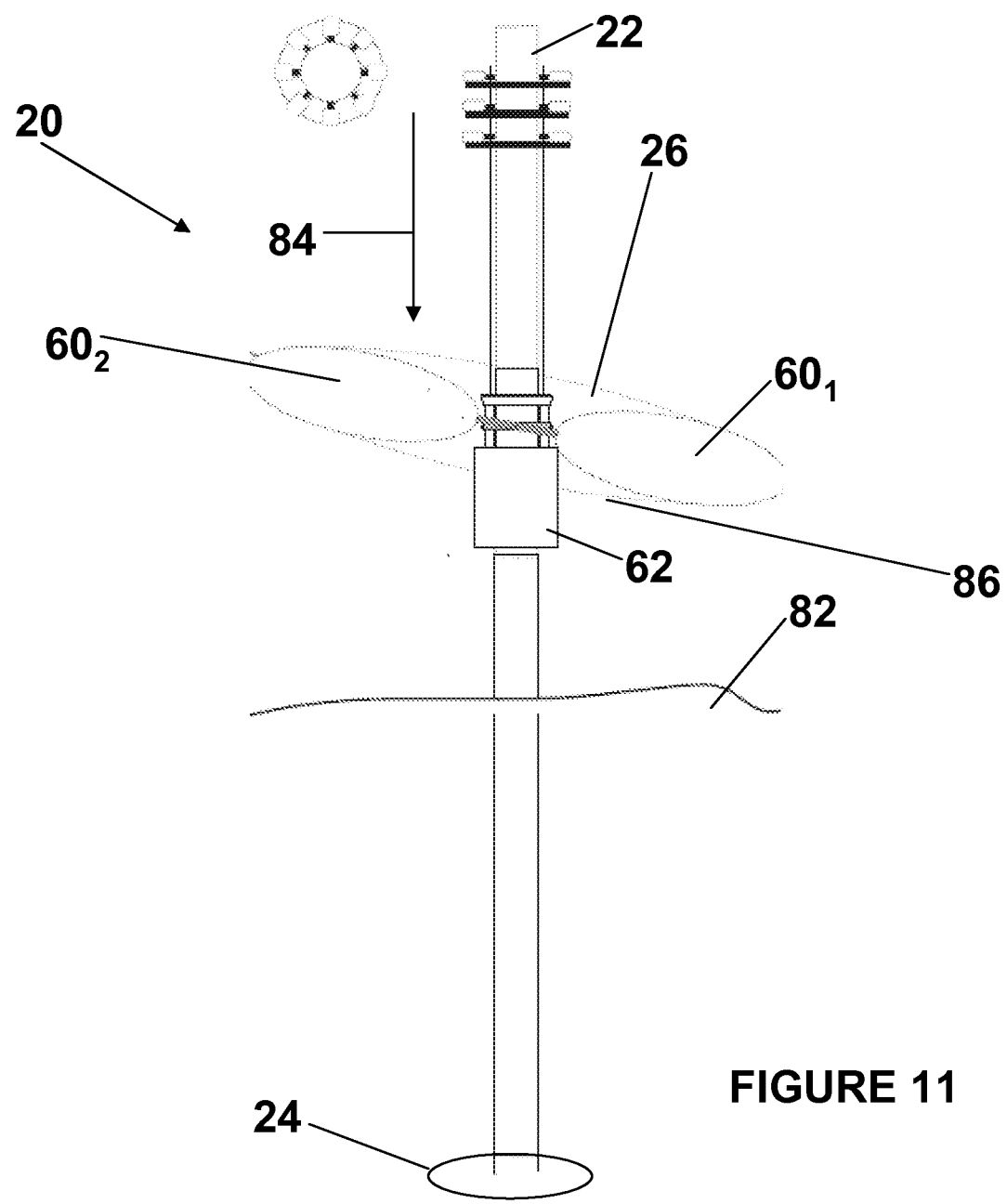
FIG. 11 illustrates the wave energy device during a wave trough corresponding to a downstroke of the wave energy device.

FIG. 11 illustrates the wave energy device during a wave trough 84 relative to the water body floor 82 corresponding to a downstroke of the wave energy device. The wave energy device 20, during the downstroke, moves down (84) the piling 22 due to the weight of the mass 62 as shown and the first buoyant portion $60_1$ is at a lower vertical position than the second buoyant portion $60_2$ so that the float again "follows" the wave shape.

Figure 12A:
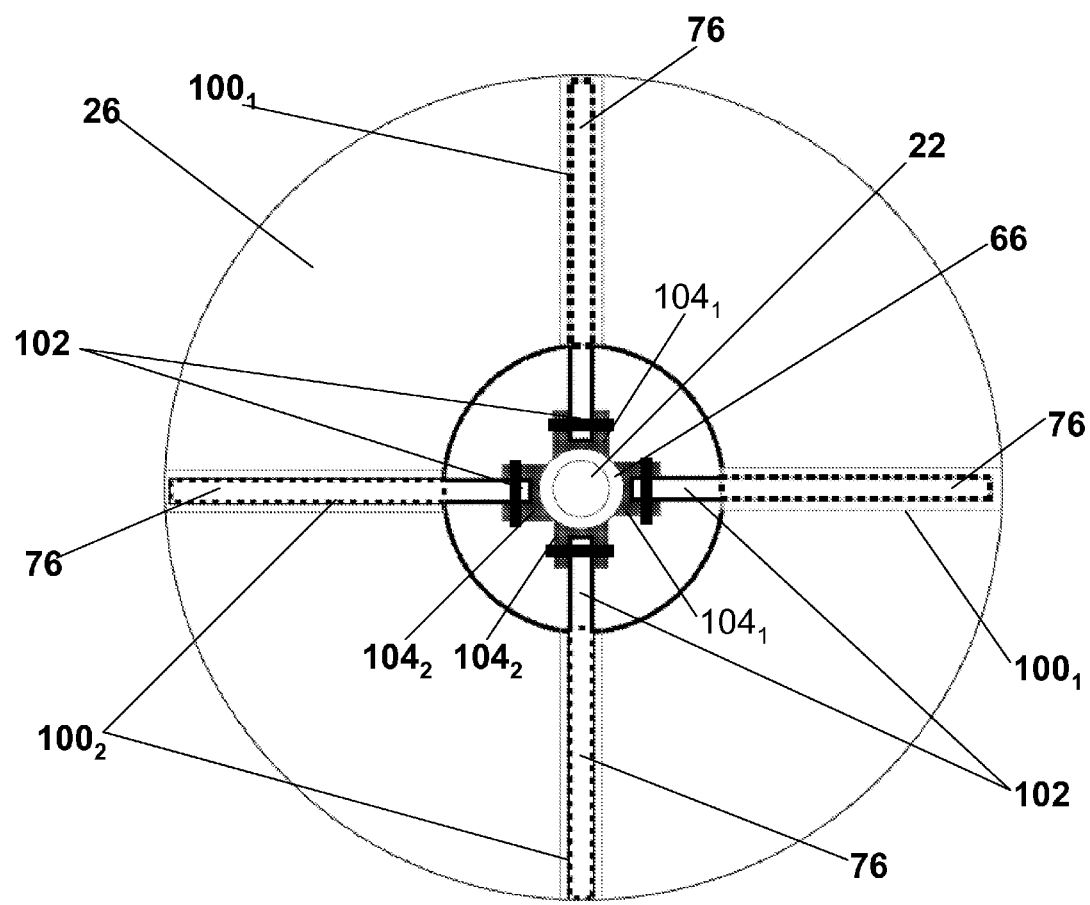
FIGS. 12A and 12B are a side cut-away view and a top view, respectively, of another embodiment of a float that can be used with the wave energy device.
Figure 12B:
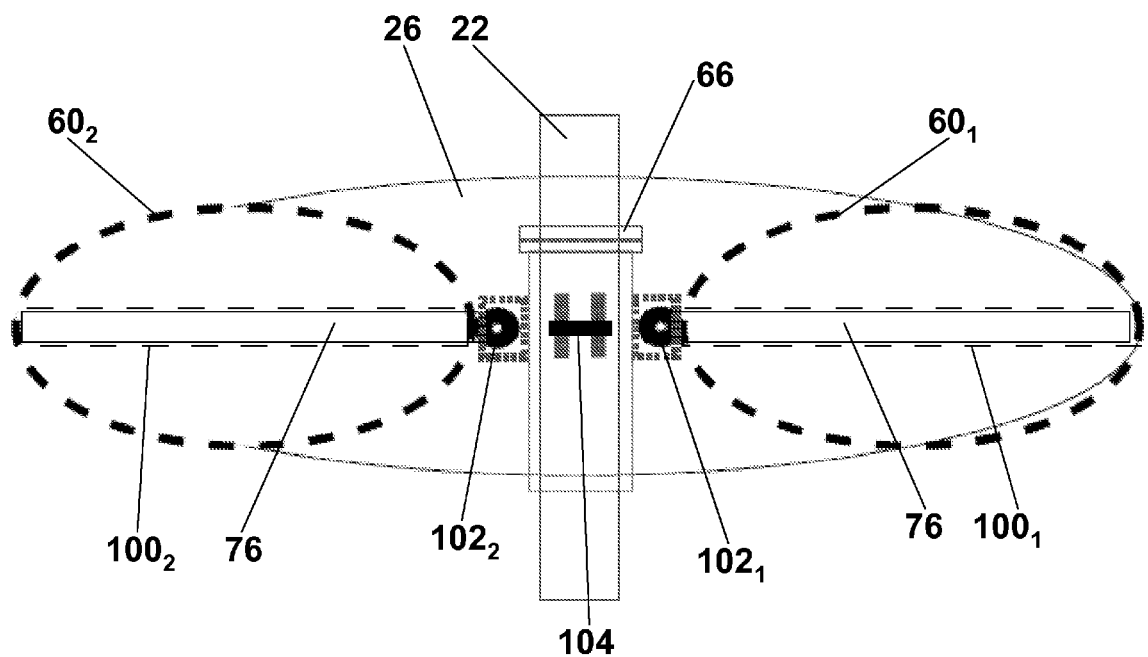

FIGS. 12A and 12B are a side cut-away view and a top view, respectively, of another embodiment of a float 26 that can be used with the wave energy device. The wave energy device operates in the same manner as described above when using these alternative embodiments of the float. Similar to the other embodiment, the float 26 has the first and second buoyant portions $60_1$, $60_2$ which are attached to the power collar 66 that encircles the piling 22. In this embodiment, the float also has one or more float rotational housings 100 (such as rotational housings $100_1$ and $100_2$ as shown in FIG. 12A) and the support shaft 76 for each buoyant portions $60_1$, $60_2$. In this embodiment, the float also has one or more swivel pins 102 (such as $102_1$ and $102_2$ as shown in FIG. 12A) and one or more lateral support brackets 104 (such as $104_1$ and $104_2$ as shown in FIG. 12A). Each rotational housing 100 is mounted inside the float and attached to bulkheads of a tubing that houses the support shaft 76 and the rotational housing allows the support shaft 76 to rotate inside its housing 100 so that the float can tip somewhat without seizing up the movement of the power collar on the piling and thus provides the float with an additional degree of freedom of motion. The support shaft 76, as with other embodiments, connects the power collar 66 to the float 26 by the one or more lateral support brackets 104. The lateral support brackets 104 allow for movements canceling out the tipping action of the float 26 while still transferring the rise & drop action to the power collar that can be used to generate the energy as described above. The swivel pins 102 retain the support shaft 76 in place on the lateral support bracket 104, but allow the support shaft 76 to rotate. In this embodiment, the yokes 64 described above are replaced by the one or more float rotational housings 100, the one or more swivel pins 102 and the one or more lateral support brackets 104. As a result, the float 26 is suspended by four points which reduces the structural stresses on the float.

Figure 12C:
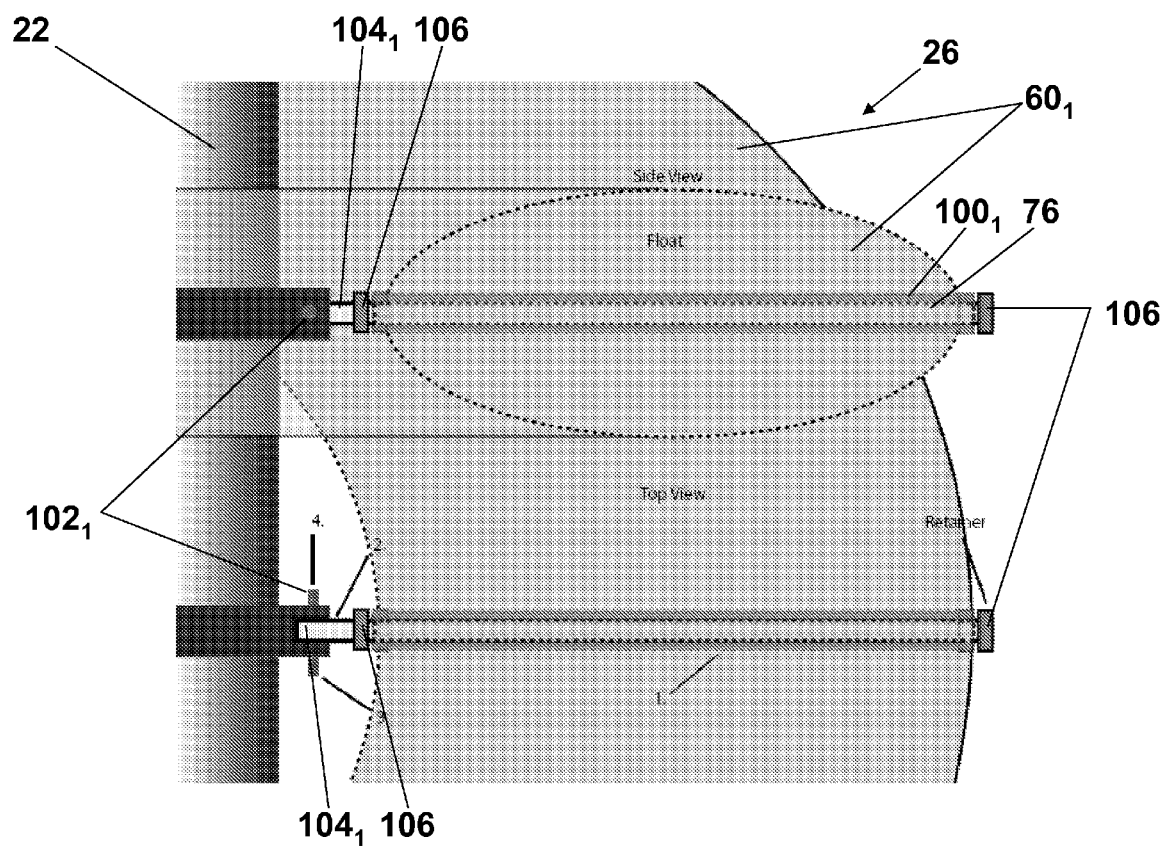
FIG. 12C is an enlarged side view and top view superimposed on each other of another embodiment of a float that can be used with the wave energy device.

FIG. 12C is an enlarged side view and top view superimposed on each other of another embodiment of a float 26 that can be used with the wave energy device. Like elements have like reference numerals and have the same structure, materials and operation as described above. As shown in FIG. 12C, the float may further comprises a retainer 106 at each end of the float rotational housings 100 that keep the float rotational housings on the support shaft 76. As shown in the side view, the swivel pin 102 and lateral support bracket 104 allow the float to move up down relative to the power collar and piling so that the float can tip somewhat without seizing up the movement of the power collar on the piling.

As an alternative to the float embodiment shown in FIGS. 12A and 12B, the float may also be constructed with a sheet or material, such as rubber, between the float 26 and the power collar 66 that isolates the float from the power collar. In addition, another alternative is to connect the mass between the float and power collar on a spring which would also isolate the float and the power collar.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A wave energy device, comprising:
   a piling;
   a float that moves vertically on the piling and is capable of generating an amount of potential energy;
   at least one drive structure that transfers a movement of the float to at least one generator that is capable of generating energy based on the vertical movement of the float; and
   the float further comprises a mass that stores potential energy during an upstroke of the float and generates kinetic energy during the downstroke of the float that is transferred to the at least one drive structure and one or more buoyant elements that allow the float with the mass to float on a wave crest.

2. The device of claim 1, wherein the float further comprises a torus that encircles the piling.

3. The device of claim 1, wherein the piling further comprises a leading edge that is capable of allowing the piling to be secured into a floor of a water body.

4. The device of claim 3, wherein the leading edge further comprises one of a flute and a set of teeth.

5. The device of claim 1, wherein the float further comprises a power collar that connects the mass to the float and transfers the movement of the mass to the float and wherein the device further comprises a drive plate that couples the float to the at least one drive structure and is capable of isolating any non-vertical movement of the float from the at least one drive structure and wherein the drive plate further comprises a lower drive plate connected to the power collar that is capable of rotational motion when the float has rotational motion, an upper drive plate connected to the at least one drive structure and an interface layer between the lower drive plate and the upper drive plate wherein the rotational motion of the float and the lower drive plate are isolated from the upper drive plate and the at least one drive structure.

6. The device of claim 5, wherein the piling has a keyway that engages the upper drive plate to prevent rotational motion of the upper drive plate and the at least one drive structure.

7. The device of claim 1, wherein the float further comprises a power collar that connects the mass to the float and transfers the movement of the mass to the float, one or more support shafts that couple the float to the power collar and a rotational housing on each support shaft that permits the float to rotate about the support shaft and one or more lateral support brackets and one or more swivel pins that connect the support shaft to the power collar and cancel out a rotation of the float.

8. An energy system, comprising:
   one or more wave energy devices, wherein each wave energy device further comprises a piling, a float that moves vertically on the piling and is capable of generating an amount of potential energy, at least one drive structure that transfers a movement of the float to at least one generator that is capable of generating energy based on the vertical movement of the float, and the float further comprises a mass that stores potential energy during an upstroke of the float and generates kinetic energy during the downstroke of the float that is transferred to the at least one drive structure and one or more buoyant elements that allow the float with the mass to float on a wave crest; and one or more generators associated with each wave energy device that generate energy based on the downward movement of each wave energy device.

9. The system of claim 8, wherein the float further comprises a torus that encircles the piling.

10. The system of claim 8, wherein the piling further comprises a leading edge that is capable of allowing the piling to be secured into a floor of a water body.

11. The system of claim 8, wherein each float further comprises a power collar that connects the mass to the float and transfers the movement of the mass to the float and wherein the device further comprises a drive plate that couples the float to the at least one drive structure and is capable of isolating any non-vertical movement of the float from the at least one drive structure and wherein the drive plate further comprises a lower drive plate connected to the power collar that is capable of rotational motion when the float has rotational motion, an upper drive plate connected to the at least one drive structure and an interface layer between the lower drive plate and the upper drive plate wherein the rotational motion of the float and the lower drive plate are isolated from the upper drive plate and the at least one drive structure.

12. The system of claim 11, wherein the piling has a keyway that engages the upper drive plate to prevent rotational motion of the upper drive plate and the at least one drive structure.

13. The system of claim 8, wherein the float further comprises a power collar that connects the mass to the float and transfers the movement of the mass to the float, one or more support shafts that couple the float to the power collar and a rotational housing on each support shaft that permits the float to rotate about the support shaft and one or more lateral support brackets and one or more swivel pins that connect the support shaft to the power collar and cancel out a rotation of the float.

14. A method for generating energy from wave motion, comprising:
providing a wave energy device having a piling inserted into a floor of a water body, a float that moves vertically relative to the piling, a drive structure to transfer a movement of the wave energy device to a generator that generates energy, wherein the float has a buoyant portion and a mass;
floating, as a wave crest in the water body approaches the wave energy device, the wave energy device on top of the wave crest to store potential energy in the wave energy device;
moving, as a wave trough in the water body approaches the wave energy device, the wave energy device with the mass downwards; and
generating energy at the generator based on the downward movement of the wave energy device.

15. The method of claim 14 further comprising transferring, using a set of drive structures and a rotating drive plate, the downward movement of the wave energy device to the generator.

16. The method of claim 15 further comprising isolating a rotational movement of the float from the drive structures using the rotating drive plate.

17. A float structure for a wave energy device, the float structure comprising:
a float that is capable of moving vertically on a piling and is capable of generating an amount of potential energy; and
the float further comprises a mass that stores potential energy during an upstroke of the float and generates kinetic energy during the downstroke of the float that is transferred to a drive structure, one or more buoyant elements that allow the float with the mass to float on a wave crest, a power collar that connects the mass to the float and transfers the movement of the mass to the float and a drive plate that couples the float to a drive structure and is capable of isolating any non-vertical movement of the float from the drive structure.

18. The float structure of claim 17, wherein the float further comprises a torus that encircles a piling of a wave energy device.

19. The float structure of claim 17 further comprising a power collar that connects the mass to the float and transfers the movement of the mass to the float and wherein the device further comprises a drive plate that couples the float to the at least one drive structure and is capable of isolating any non-vertical movement of the float from the at least one drive structure and wherein the drive plate further comprises a lower drive plate connected to the power collar that is capable of rotational motion when the float has rotational motion, an upper drive plate connected to the at least one drive structure and an interface layer between the lower drive plate and the upper drive plate wherein the rotational motion of the float and the lower drive plate are isolated from the upper drive plate and the at least one drive structure.

20. The float structure of claim 19, wherein the piling has a keyway that engages the upper drive plate to prevent rotational motion of the upper drive plate and the at least one drive structure.

21. The float structure of claim 17 further comprising a power collar that connects the mass to the float and transfers the movement of the mass to the float, one or more support shafts that couple the float to the power collar and a rotational housing on each support shaft that permits the float to rotate about the support shaft and one or more lateral support brackets and one or more swivel pins that connect the support shaft to the power collar and cancel out a rotation of the float.

22. A wave energy device, comprising:
a piling;
a float that moves vertically on the piling and is capable of generating an amount of potential energy;
at least one drive structure that transfers a movement of the float to at least one generator that is capable of generating energy based on the vertical movement of the float; and
the float further comprises a mass that stores potential energy during an upstroke of the float and generates kinetic energy during the downstroke of the float that is transferred to the at least one drive structure, one or more buoyant elements that allow the float with the mass to float on a wave crest, a power collar that connects the mass to the float and transfers the movement of the mass to the float, one or more support shafts that couple the float to the power collar and a rotational housing on each support shaft that permits the float to rotate about the support shaft and one or more lateral support brackets and one or more swivel pins that connect the support shaft to the power collar and cancel out a rotation of the float.

* * * * *